United States Patent
Shallal et al.

(10) Patent No.: US 12,067,261 B2
(45) Date of Patent: Aug. 20, 2024

(54) SERIAL PRESENCE DETECT LOGGING

(71) Applicant: Rambus Inc., San Jose, CA (US)

(72) Inventors: Aws Shallal, Cary, NC (US); Chen Chen, Cupertino, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/857,252

(22) Filed: Jul. 5, 2022

(65) Prior Publication Data

US 2023/0014101 A1 Jan. 19, 2023

Related U.S. Application Data

(60) Provisional application No. 63/270,977, filed on Oct. 22, 2021, provisional application No. 63/222,298, filed on Jul. 15, 2021.

(51) Int. Cl.
*G06F 12/00* (2006.01)
*G06F 3/06* (2006.01)

(52) U.S. Cl.
CPC .......... *G06F 3/0622* (2013.01); *G06F 3/0644* (2013.01); *G06F 3/0683* (2013.01)

(58) Field of Classification Search
CPC .... G06F 3/0622; G06F 3/0644; G06F 3/0683; G06F 3/0637; G06F 21/79; G06F 3/0679
See application file for complete search history.

(56) References Cited

U.S. PATENT DOCUMENTS

| | | | |
|---|---|---|---|
| 7,487,428 B2 | 2/2009 | Co et al. | |
| 8,239,919 B2* | 8/2012 | Le | G06F 21/78 711/158 |
| 10,558,520 B2 | 2/2020 | Shaeffer et al. | |
| 10,628,309 B1* | 4/2020 | Deiderich, III | G06F 3/0683 |
| 10,838,793 B2 | 11/2020 | Wang et al. | |
| 11,385,807 B1* | 7/2022 | Emelyanov | G06F 3/0622 |
| 2006/0090053 A1* | 4/2006 | Boning | G06F 12/1441 711/163 |
| 2007/0101114 A1 | 5/2007 | Inoue et al. | |
| 2008/0046997 A1* | 2/2008 | Wang | G06F 21/79 726/16 |
| 2008/0061941 A1* | 3/2008 | Fischer | H04L 9/3226 340/10.1 |
| 2009/0198485 A1* | 8/2009 | Norman | G11C 16/22 703/24 |
| 2012/0151126 A1* | 6/2012 | Moore | G06F 21/79 711/E12.008 |
| 2012/0246713 A1* | 9/2012 | Liao | G06F 12/1433 726/16 |
| 2013/0019305 A1* | 1/2013 | Berenbaum | G06F 21/44 726/19 |

(Continued)

*Primary Examiner* — Shawn X Gu
*Assistant Examiner* — Mohammad S Hasan
(74) *Attorney, Agent, or Firm* — The Neudeck Law Firm, LLC

(57) ABSTRACT

A serial presence detect (SPD) device includes a region of nonvolatile memory for SPD data and an additional region for other (e.g., vendor) use. The additional region may be subdivided into write protect regions that can be individually and independently write protected. To configure the write protection, a password key scheme is used to enter a mode whereby the write protection attributes may be configured. Another password key scheme is used to exit the write protection configuration mode.

20 Claims, 6 Drawing Sheets

(56) References Cited

U.S. PATENT DOCUMENTS

| | | | | |
|---|---|---|---|---|
| 2013/0146487 A1* | 6/2013 | Macor | ............... | B65D 85/58 |
| | | | | 206/232 |
| 2014/0258599 A1* | 9/2014 | Rostoker | ............... | G06F 3/0679 |
| | | | | 711/163 |
| 2015/0121537 A1* | 4/2015 | Ellis | ............... | G06F 21/60 |
| | | | | 726/26 |
| 2015/0253787 A1* | 9/2015 | Mullin | ............... | G06Q 10/00 |
| | | | | 318/16 |
| 2016/0070616 A1* | 3/2016 | Tavallaei | ............... | G06F 3/064 |
| | | | | 714/766 |
| 2016/0077979 A1* | 3/2016 | Lesartre | ............... | G06F 3/0679 |
| | | | | 711/164 |
| 2017/0076096 A1* | 3/2017 | Challener | ............... | G06F 11/1469 |
| 2020/0134186 A1* | 4/2020 | Hong | ............... | G06F 21/575 |
| 2022/0027520 A1* | 1/2022 | Li | ............... | G06F 11/0772 |
| 2022/0244860 A1* | 8/2022 | Pohlmann | ............... | G06F 3/0683 |

\* cited by examiner

```
┌─────────────────────────────────────────────────────────┐
│ ACCESS SERIAL PRESENCE DETECT INFORMATION IN A FIRST    │
│      PLURALITY OF NONVOLATILE MEMORY LOCATIONS          │
│                          302                            │
└─────────────────────────────────────────────────────────┘
                              │
┌─────────────────────────────────────────────────────────┐
│ ACCESS, SUBJECT TO WRITE ACCESS PROTECTION, A SECOND    │
│ PLURALITY OF NONVOLATILE MEMORY LOCATIONS THAT HOLD FIRST│
│                         DATA                            │
│                          304                            │
└─────────────────────────────────────────────────────────┘
                              │
┌─────────────────────────────────────────────────────────┐
│ COMPLETE A FIRST PASSWORD KEY SCHEME TO CONFIGURE THE   │
│ WRITE ACCESS PROTECTION OF THE SECOND PLURALITY OF      │
│           NONVOLATILE MEMORY LOCATIONS.                 │
│                          306                            │
└─────────────────────────────────────────────────────────┘
```

*FIG. 3*

SERIAL PRESENCE DETECT LOGGING

BRIEF DESCRIPTION OF THE DRAWINGS

FIG. 3 is a flowchart illustrating a method of configure write access protections.

DETAILED DESCRIPTION OF THE EMBODIMENTS

In an embodiment, a serial presence detect (SPD) device includes a region of nonvolatile memory for SPD data and an additional region for other (e.g., vendor) use. The additional region may be subdivided into write protect regions that can be individually and independently write protected. To configure the write protection, a password key scheme is used to enter a mode whereby the write protection attributes may be configured. Another password key scheme is used to exit the write protection configuration mode.

Figure 1:
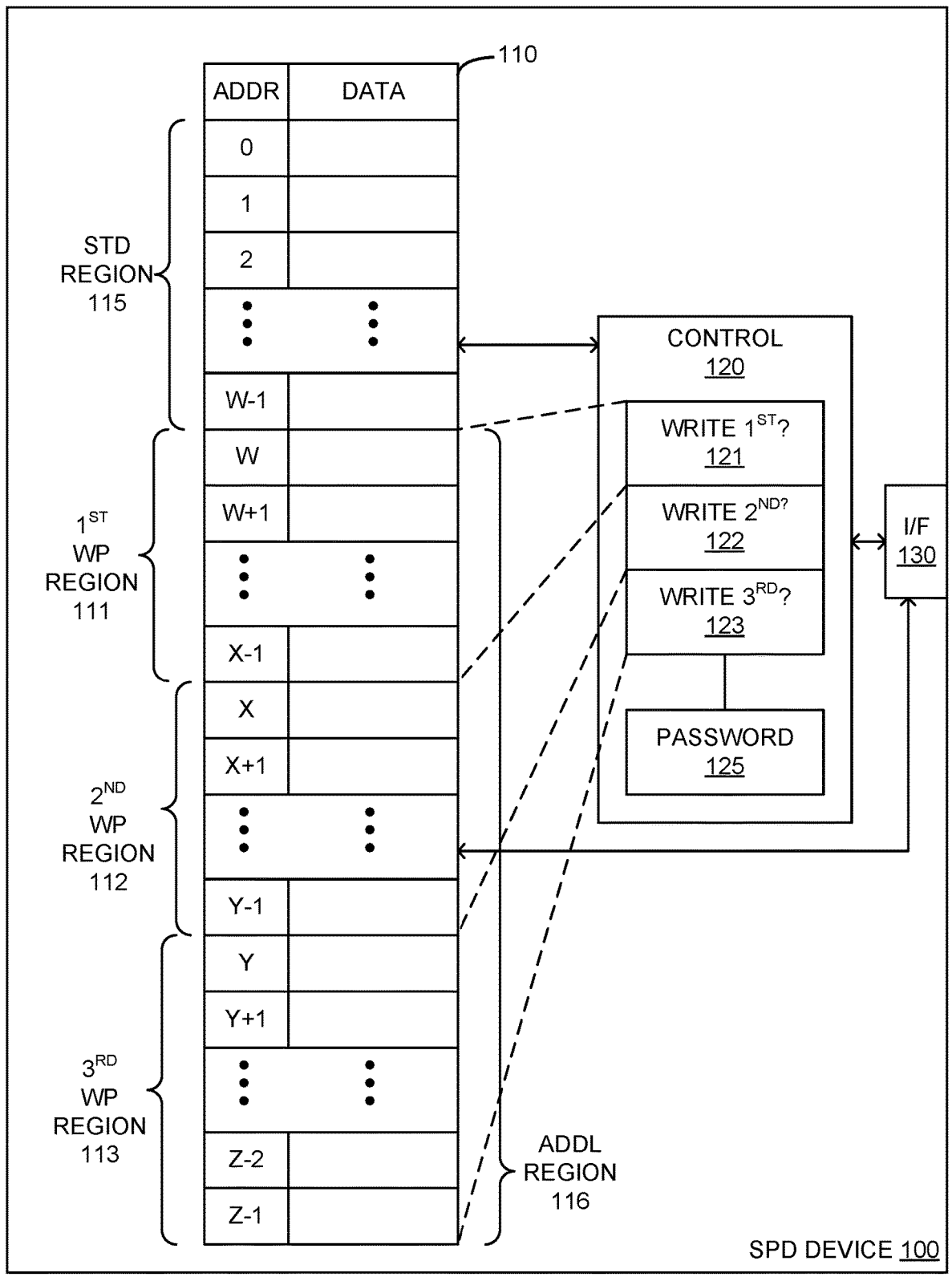
FIG. 1 is a block diagram illustrating a serial presence detect device.

FIG. 1 is a block diagram illustrating a serial presence detect device. In FIG. 1, serial presence detect (SPD) device 100 comprises nonvolatile memory 110, control circuitry 120, and interface 130. Control circuitry 120 includes write control bits 121-123, and password value register 125. Interface 130 is operatively coupled to control circuitry 120 and nonvolatile memory 110. Control circuitry 120 is also operatively coupled to nonvolatile memory 110.

The address space of nonvolatile memory 110 is organized into a standard region 115 running from address 0 to address W-1, and additional region 116 running from address W to address Z-1. Thus, nonvolatile memory 110 has Z memory locations. Additional region 116 is further organized into a first write protect region 111 running from address W to address X-1, a second write protect region 112 running from address X to address Y-1, and a third write protect region running from address Y to address Z-1. It should be understood that W, X, Y, and Z are all integers greater than 0 and W<X<Y<Z.

In an embodiment, each address in nonvolatile memory 110 accesses one (1) byte and W=0x400 (hex), X=0x500 (hex), Y=0x600 (hex), and Z=0x700 (hex). Thus, in this embodiment, standard region 115 is 1024 bytes and the first write protect region 111, second write protect region 112, and third write protect region 113 are each 256 bytes. In an embodiment, standard region 115 stores SPD data according to a standard (e.g., JEDEC SPD standard) and additional region 116 may be used store other information. For example, additional region 116 may be used to store vendor information (e.g., vendor specific logs, vendor specific configuration information, etc.), user information (e.g., user specific logs, user specific configuration information, etc.), and/or manufacturer information (e.g., manufacturer specific logs, manufacturer specific configuration information, etc.), and the like.

Interface 130 receives commands, addresses, and data from a host (not shown in FIG. 1). In response to commands received via interface 130, control circuitry 120 controls nonvolatile memory 110 to access one or more memory locations. If the access is a read command, nonvolatile memory 110 is controlled to provide the contents of one or more memory locations to interface 130 for further provision to the host. If the access is a write command directed to a memory location in the standard region, nonvolatile memory 110 is controlled to write data received via interface 130 as the new contents of one or more memory locations.

In an embodiment, the value of first write control bit 121 determines whether or not the contents of memory locations in first write protect region 111 may be overwritten; the value of second write control bit 122 determines whether or not the contents of memory locations in second write protect region 112 may be overwritten; and, the value of third write control bit 123 determines whether the contents of memory locations in third write protect region 111 may be overwritten. Thus, if the access is a write command directed to a memory location in the additional region, and the value of the corresponding write control bit 121-123 permits a write operation to the addressed write protect region 111-113, nonvolatile memory 110 is controlled to write data received via interface 130 as the new contents of one or more memory locations. If the access is a write command directed to a memory location in the additional region, and the value of the corresponding write control bit 121-123 does not permit a write operation to the addressed write protect region 111-113, control circuitry 120 may ignore the write command.

In an embodiment, the value (i.e., to permit or not permit writes) of each write control bit 121-123 is settable independent of the other write control bits 121-123. Thus, writes to each write protect region 111-113 may be permitted or not permitted independent of whether writes are permitted or not permitted to the other of write protect regions 111-113.

In an embodiment, control circuitry 120 requires the successful completion of a first password key scheme before allowing the values of write control bits 121-123 to be changed. For example, control circuitry 120 may require interface 130 to receive two successive write commands, directed to a first internal, to control circuitry 120, register (e.g., a mode register) of the value stored in password value register 125 in order to place control circuitry 120 into a first mode whereby the values of write control bits 121-123 may be changed/written.

In an embodiment, control circuitry 120 requires the successful completion of a second password key scheme to exit the mode where the values of write control bits 121-123 may be changed. For example, control circuitry 120 may require interface 130 to receive two successive write commands, directed to the first internal register (e.g., a mode register). In order to place control circuitry 120 into a second mode whereby the values of write control bits 121-123 may not be changed/written, the first write is required to be the value stored in password value register 125 and the second write is required to not be the value stored in password value register 125.

Figure 2:
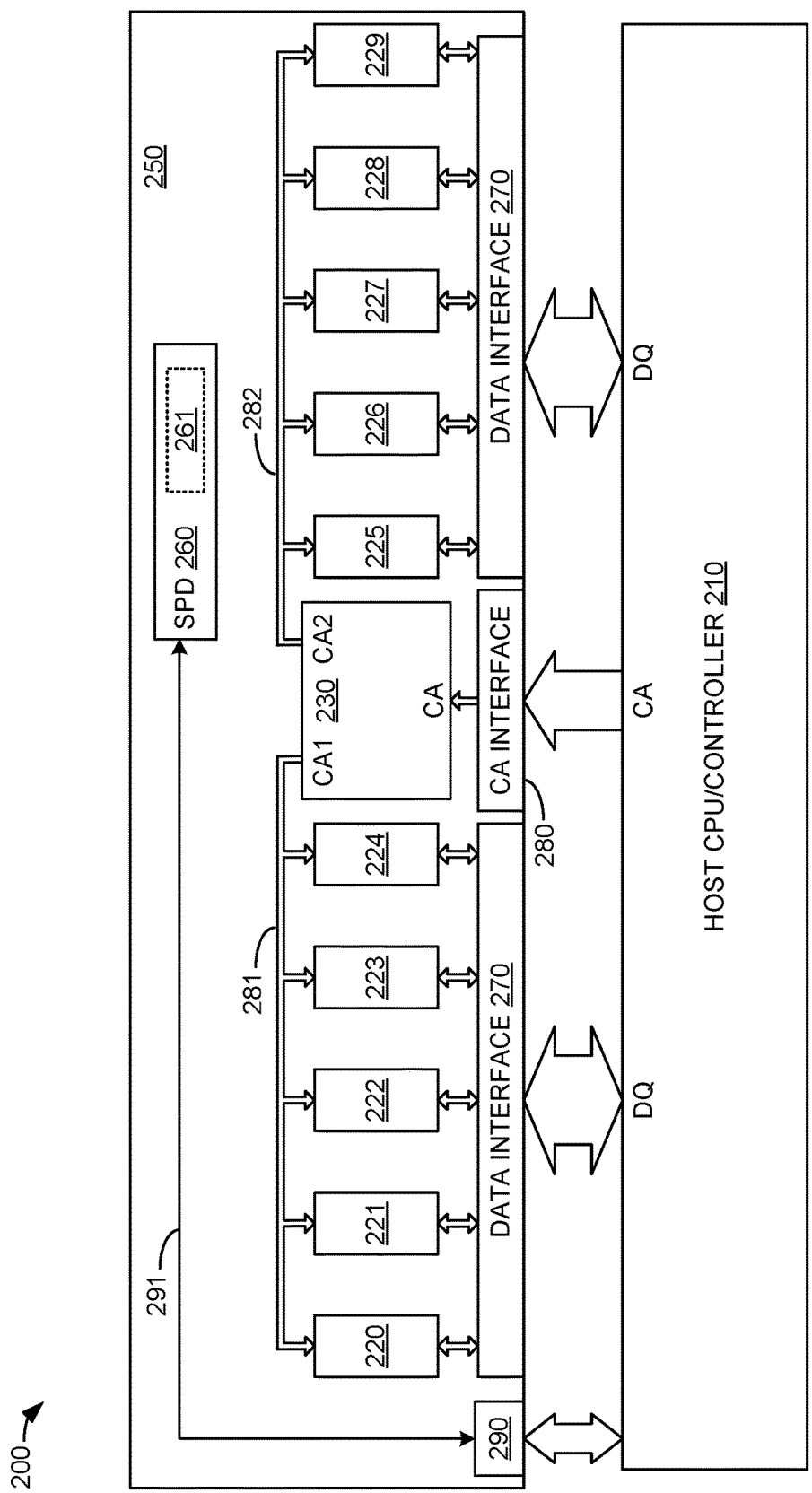
FIG. 2 is a block diagram illustrating a memory module.

FIG. 2 is a block diagram illustrating an example memory module. In FIG. 2, system 200 comprises host CPU/controller (host) 210 and module 250. Host 210 is operatively coupled to module 250 via data signals (DQ), command-address signals (CA), and serial presence detect signals. Module 250 includes memory components 220-229, buffer device 230, serial presence detect (SPD) device 260, data interface 270, command-address interface 280, and SPD interface 290. Command-address interface 280 is operatively coupled to buffer device 230. Buffer device 230 is operatively coupled to memory components 220-224 via secondary command-address signals CA1 281 (also referred to as CA bus 281). Buffer device 230 is operatively coupled to memory components 225-229 via secondary command-address signals CA2 282 (also referred to as CA bus 282).

SPD interface 290 is operatively coupled to SPD device 260 via SPD signals 291. SPD device 260 includes EDC circuitry 261. SPD interface 290 and SPD signals 291 may implement or conform to a serial channel communication protocol or specification. For example, SPD interface 290 and SPD signals 291 may be, or comprise, one or more signals that conform to a serial presence detect (SPD) bus, I2C bus, and/or I3C bus. SPD device 260 may be, or comprise, SPD device 100 as discussed herein with respect to FIG. 1.

Buffer device 230 may also be referred to as a command/address (CA) Register. Thus, module 250 may be considered to be a registered module, or Registered Dual Inline Memory Module (R-DIMM). This, however, is merely one example of the types of module that may include SPD device 260. Other examples of modules include dual inline memory module (DIMM) such as DDR4, DDR5 etc. DIMM, load reduced DIMM (LRDIMM), registered DIMM (RDIMM), fully buffered DIMM (FB-DIMM), or unbuffered DIMM (UDIMM).

Host 210, memory components 220-229, buffer device 230, and SPD device 260 may be or comprise integrated circuit type devices, such as are commonly referred to as "chips". The controller functionality of a memory controller (such as the controller functionality of host 210) manages the flow of data going to and from memory devices and/or memory modules. Memory components 220-229 may be standalone devices, or may include multiple memory integrated circuit dies—such as components of a multi-chip module. A memory controller can be a separate, standalone chip, or integrated into another chip. For example, a memory controller may be included on a single die with a microprocessor, or included as part of a more complex integrated circuit system such as a block of a system on a chip (SOC).

Buffer device 230 is operatively coupled to CA interface 280 and memory components 220-229 to help isolate the electrical loading of the on-module DRAM memory components 220-229 from the command-address channel coupled to host 210. Without buffer device 230, the aggregate load of memory components 220-229 would degrade the achievable signaling rate of the command-address channel and hence the overall bandwidth performance of the memory subsystem. In an embodiment, all command-address traffic sent between host 210 and memory components 220-229 is first received by buffer device 230 via CA interface 280.

In FIG. 2, a single CA interface 280 and two sets of secondary CA signals 281-282 are illustrated. It should be understood however, that in some embodiments, buffer device 230 may receive independent CA signals over two respective independent CA interfaces. These sets of independent CA signals may be received, for example, on opposite sides of module 250. In another example, these sets of independent CA signals may be time or otherwise multiplexed with each other on the same set of signal traces. Buffer device 230 may receive each of the two sets of independent CA signals and drive each of the two sets of CA signals, respectively, to two secondary CA signal sets (i.e., two channels from a host to 4 CA channels, where each DRAM channel includes a set of 4 or 5 DRAMs—two DRAM channels on the right and two DRAM channels on the left.)

In response to commands from host 210 received via SPD interface 290, SPD device 260 may access one or more memory locations. If the access is a read command, SPD device 260 provides the contents of one or more nonvolatile memory locations to SPD interface 290 for further provision to host 210. If the access from host 210 is a write command directed to a memory location in a standard region, SPD device 260 writes data received via SPD interface 290 as the new contents of one or more nonvolatile memory locations.

In an embodiment, SPD device 260 include write control bits. The values of these write control bits determine whether or not the contents of memory locations in corresponding write protect regions. Thus, if the access is a write command directed to a memory location in an additional region, and the value of the corresponding write control bit permits a write operation to the addressed write protect region, 111-113, SPD device 260 writes data received via SPD interface 290 as the new contents of one or more nonvolatile memory locations. If the access is a write command directed to a memory location in the additional region, and the value of the corresponding write control bit does not permit a write operation to the addressed write protect region, SPD device 260 may ignore the write command.

In an embodiment, the value (i.e., to permit or not permit writes) of each write control bit in SPD device 260 is settable independent of the other write control bits. Thus, writes to each write protect region may be permitted or not permitted independent of whether writes are permitted or not permitted to the other of write protect regions.

In an embodiment, SPD device 260 requires the successful completion of a first password key scheme before allowing the values of the write control bits to be changed. For example, SPD device 260 may require SPD interface 290 to receive two successive write commands, directed to a first internal, to SPD device 260, register (e.g., a mode register) of the value stored in a password register in order to place SPD device 260 into a first mode whereby the values of the write control bits may be changed/written.

In an embodiment, SPD device 260 requires the successful completion of a second password key scheme to exit the mode where the values of the write control bits may be changed. For example, SPD device 260 may require SPD interface 290 to receive two successive write commands, directed to the first internal register (e.g., a mode register). In order to place SPD device 260 into a second mode whereby the values of the write control bits may not be changed/written, the first write is required to be the value stored in the password register and the second write is required to not be the value stored in password register.

FIG. 3 is a flowchart illustrating a method of configure write access protections. One or more steps illustrated in FIG. 3 may be performed by, for example, SPD device 100, system 200, and/or their components. Serial presence detect information is accessed in a plurality of nonvolatile memory locations (302). For example, host 210 may access standard region (e.g., standard region 115) data in SPD device 260.

Subject to write access protection, a second plurality of nonvolatile memory locations that hold first data are accessed (304). For example, host 210 may access an additional region (e.g., additional region 116) that is subject to write access protection (e.g., subject to values in write control bits 121-123). A first password key scheme is completed to configure the write access protection of the second plurality of nonvolatile memory locations (306). For example, host 210 may complete a password key scheme to place SPD device 260 in a mode where the write access protection(s) of the additional region may be configured/altered.

Figure 4:
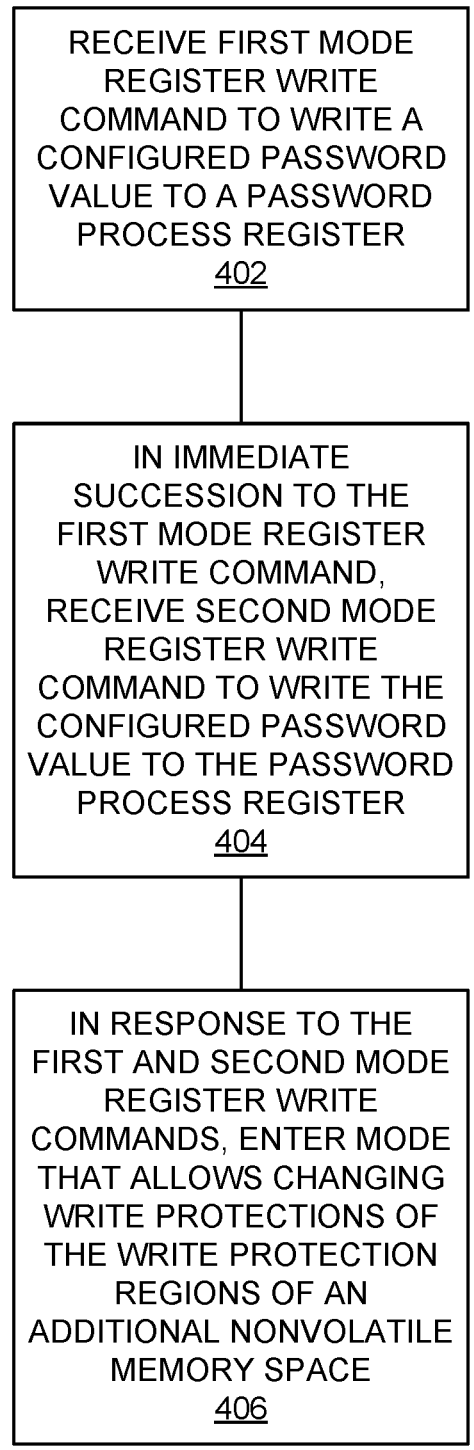
FIG. 4 is a flowchart illustrating a method of entering a configuration mode.

FIG. 4 is a flowchart illustrating a method of entering a configuration mode. One or more steps illustrated in FIG. 4 may be performed by, for example, SPD device 100, system 200, and/or their components. A first mode register write command is received to write a configured password value to a password process register (402). For example, interface 130 may receive a first mode register write command to write the value in password value register 125 to a mode register associated with a password process.

In immediate succession to the first mode register write command, a second mode register write command is received to write the configured password value to the password process register (404). For example, in immediate succession to the first mode register write command, interface 130 may receive a second mode register write command to write the value in password value register 125 to the mode register associated with the password process. In response to the first and second mode register write commands, a mode that allows changing of the write protections of the write protection regions of an additional nonvolatile memory space is entered (406). For example, in response to the first and second mode register write commands, SPD device 100 may enter into a first mode whereby the values of write control bits 121-123 may be changed/written.

Figure 5:
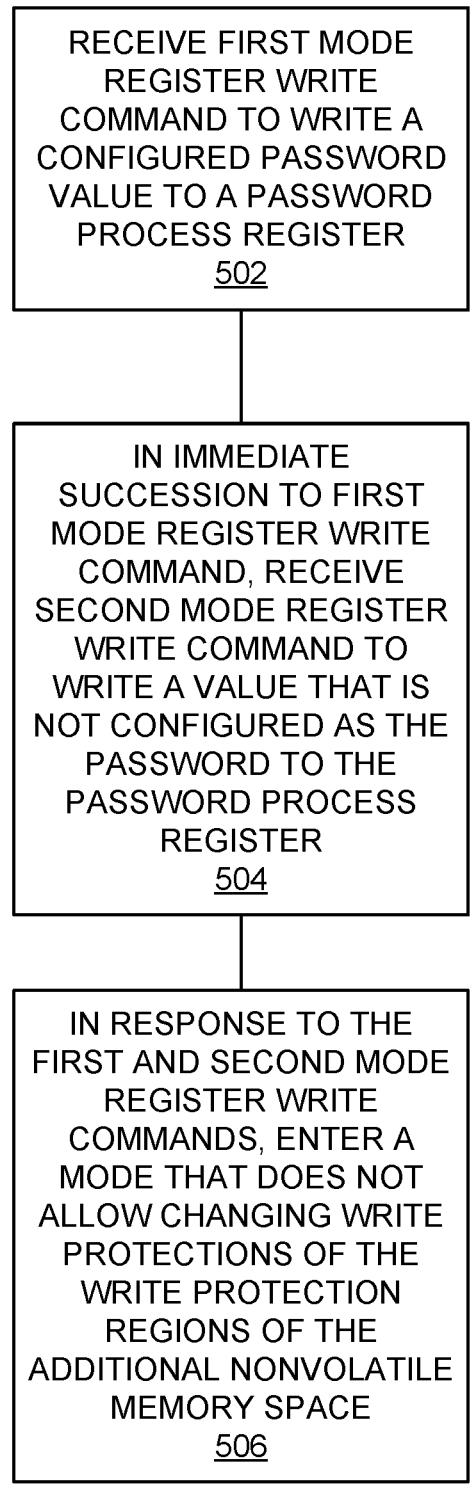
FIG. 5 is a flowchart illustrating a method of exiting a configuration mode.

FIG. 5 is a flowchart illustrating a method of exiting a configuration mode. One or more steps illustrated in FIG. 5 may be performed by, for example, SPD device 100, system 200, and/or their components. A first mode register write command is received to write a configured password value to a password process register (502). For example, while in a mode that allows changing write control bits 121-123, interface 130 may receive a first mode register write command to write the value in password value register 125 to a mode register associated with a password process.

In immediate succession to the first mode register write command, a second mode register write command is received to write a value that is not the configured password value to the password process register (504). For example, in immediate succession to the first mode register write command, interface 130 may receive a second mode register write command to write a value that is not equal to the value in password value register 125, to the mode register associated with the password process. In response to the first and second mode register write commands, a mode that does not allow changing of the write protections of the write protection regions of the additional nonvolatile memory space is entered (506). For example, in response to the first and second mode register write commands, SPD device 100 may enter into a second mode whereby the values of write control bits 121-123 cannot not be changed/written.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of SPD device 100, system 200, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 6:
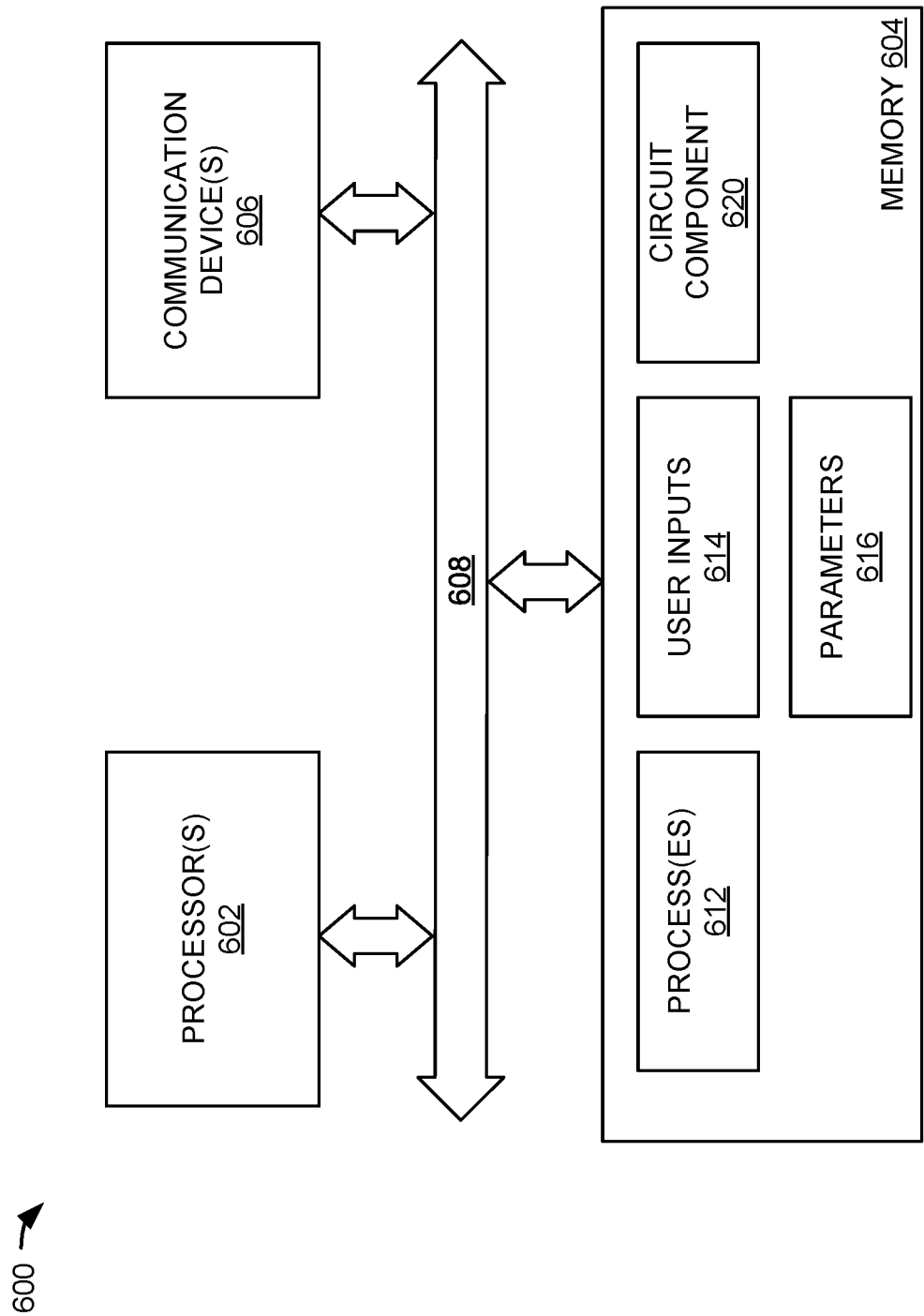
FIG. 6 is a block diagram of a processing system.

FIG. 6 is a block diagram illustrating one embodiment of a processing system 600 for including, processing, or generating, a representation of a circuit component 620. Processing system 600 includes one or more processors 602, a memory 604, and one or more communications devices 606. Processors 602, memory 604, and communications devices 606 communicate using any suitable type, number, and/or configuration of wired and/or wireless connections 608.

Processors 602 execute instructions of one or more processes 612 stored in a memory 604 to process and/or generate circuit component 620 responsive to user inputs 614 and parameters 616. Processes 612 may be any suitable electronic design automation (EDA) tool or portion thereof used to design, simulate, analyze, and/or verify electronic circuitry and/or generate photomasks for electronic circuitry. Representation 620 includes data that describes all or portions of SPD device 100, system 200, and their components, as shown in the Figures.

Representation 620 may include one or more of behavioral, register transfer, logic component, transistor, and layout geometry-level descriptions. Moreover, representation 620 may be stored on storage media or communicated by carrier waves.

Data formats in which representation 620 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 614 may comprise input parameters from a keyboard, mouse, voice recognition interface, microphone and speakers, graphical display, touch screen, or other type of user interface device. This user interface may be distributed among multiple interface devices. Parameters 616 may include specifications and/or characteristics that are input to help define representation 620. For example, parameters 616 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 604 includes any suitable type, number, and/or configuration of non-transitory computer-readable storage media that stores processes 612, user inputs 614, parameters 616, and circuit component 620.

Communications devices 606 include any suitable type, number, and/or configuration of wired and/or wireless devices that transmit information from processing system 600 to another processing or storage system (not shown) and/or receive information from another processing or storage system (not shown). For example, communications devices 606 may transmit circuit component 620 to another system. Communications devices 606 may receive processes 612, user inputs 614, parameters 616, and/or circuit component 620 and cause processes 612, user inputs 614, parameters 616, and/or circuit component 620 to be stored in memory 604.

Implementations discussed herein include, but are not limited to, the following examples:

Example 1: A serial presence detect memory device, comprising: a first plurality of nonvolatile memory locations to store serial presence detect information according to a serial presence detect standard; and a second plurality of nonvolatile memory locations to store first data, the second plurality of nonvolatile memory locations subject to write access protection that is configurable based on a successful completion of a first password key scheme.

Example 2: The serial presence detect memory device of example 1, wherein the write access protection becomes not configurable based on a successful completion of a second password key scheme.

Example 3: The serial presence detect memory device of example 1, wherein the second plurality of nonvolatile memory locations is divided into a plurality of groups of memory locations, whether each group of the plurality of groups of memory locations is subject to write access protection is independently configurable.

Example 4: The serial presence detect memory device of example 3, each group of the plurality of groups of memory locations comprises 256 memory locations.

Example 5: The serial presence detect memory device of example 4, wherein there are three groups of memory locations in the plurality of groups of memory locations.

Example 6: The serial presence detect memory device of example 2, wherein a first password necessary for the successful completion of the first password key scheme is configurable.

Example 7: The serial presence detect memory device of example 6, wherein a second password necessary for the successful completion of the second password key scheme is configurable.

Example 8: A module, comprising: a plurality of volatile memory devices; a nonvolatile memory device comprising: a first plurality of nonvolatile memory locations to store serial presence detect information about the plurality of volatile memory devices; and a second plurality of nonvolatile memory locations to store first data, the second plurality of nonvolatile memory locations subject to write access protection that is configurable based on a successful completion of a first password key scheme.

Example 9: The module of example 8, wherein the first plurality of nonvolatile memory locations are to store serial presence detect information according to a serial presence detect standard.

Example 10: The module of example 8, wherein the write access protection becomes not configurable based on a successful completion of a second password key scheme.

Example 11: The module of example 8, wherein the second plurality of nonvolatile memory locations is divided into a plurality of groups of memory locations, whether each group of the plurality of groups of memory locations is subject to write access protection is independently configurable.

Example 12: The module of example 11, each group of the plurality of groups of memory locations comprises 256 memory locations.

Example 13: The module of example 12, wherein there are three groups of memory locations in the plurality of groups of memory locations.

Example 14: The module of example 10, wherein a first password necessary for the successful completion of the first password key scheme is configurable.

Example 15: The module of example 14, wherein a second password necessary for the successful completion of the second password key scheme is configurable.

Example 16: A method, comprising: accessing serial presence detect information in a first plurality of nonvolatile memory locations; accessing, subject to write access protection, a second plurality of nonvolatile memory locations that hold first data; and completing a first password key scheme to configure the write access protection of the second plurality of nonvolatile memory locations.

Example 17: The method of example 16, wherein serial presence detect information in the first plurality of nonvolatile memory locations is stored according to a serial presence detect standard.

Example 18: The method of example 17, further comprising: completing of a second password key scheme to cause the write access protection of the second plurality of nonvolatile memory locations become not configurable.

Example 19: The method of example 18, wherein the second plurality of nonvolatile memory locations is divided into a plurality of groups of memory locations, the method further comprising: configuring the write access protection of a first group of the plurality of groups of memory locations independently of the other of the plurality of groups of memory locations.

Example 20: The method of example 19, wherein each group of the plurality of groups of memory locations comprises 256 memory locations and there are three groups of memory locations in the plurality of groups of memory locations.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A serial presence detect memory device, comprising:
   a password register;
   a first plurality of nonvolatile memory locations to store serial presence detect information according to a serial presence detect standard; and
   a second plurality of nonvolatile memory locations to store first data, the second plurality of nonvolatile memory locations subject to write access protection that is configurable and the write access protection is to become not configurable based on the serial presence detect memory device receiving a first write command to write a first value stored in the password register and in succession to the first write command, receiving a second write command to write a second value that is not stored in the password register.

2. The serial presence detect memory device of claim 1, wherein the write access protection becomes configurable based on the serial presence detect memory device receiving two successive write commands to write the first value stored in the password register.

3. The serial presence detect memory device of claim 1, wherein the second plurality of nonvolatile memory locations is divided into a plurality of groups of memory locations, whether each group of the plurality of groups of memory locations is subject to write access protection is independently configurable.

4. The serial presence detect memory device of claim 3, each group of the plurality of groups of memory locations comprises 256 memory locations.

5. The serial presence detect memory device of claim 4, wherein there are three groups of memory locations in the plurality of groups of memory locations.

6. The serial presence detect memory device of claim 1, wherein the first value is configurable.

7. The serial presence detect memory device of claim 1, wherein the second value is configurable.

8. A module, comprising:
a plurality of volatile memory devices;
a nonvolatile memory device comprising:
a password register;
a first plurality of nonvolatile memory locations to store serial presence detect information about the plurality of volatile memory devices; and
a second plurality of nonvolatile memory locations to store first data, the second plurality of nonvolatile memory locations subject to write access protection that is configurable and the write access protection is to become not configurable based on the serial presence detect memory device receiving a first write command to write a first value stored in the password register and in succession to the first write command, receiving a second write command to write a second value that is not stored in the password register.

9. The module of claim 8, wherein the first plurality of nonvolatile memory locations are to store serial presence detect information according to a serial presence detect standard.

10. The module of claim 8, wherein the write access protection becomes configurable based on the nonvolatile memory device receiving two successive write commands to write the first value stored in the password register.

11. The module of claim 8, wherein the second plurality of nonvolatile memory locations is divided into a plurality of groups of memory locations, whether each group of the plurality of groups of memory locations is subject to write access protection is independently configurable.

12. The module of claim 11, each group of the plurality of groups of memory locations comprises 256 memory locations.

13. The module of claim 12, wherein there are three groups of memory locations in the plurality of groups of memory locations.

14. The module of claim 10, wherein the first value is configurable.

15. The module of claim 14, wherein the second value is configurable.

16. A method, comprising:
accessing serial presence detect information in a first plurality of nonvolatile memory locations;
accessing, subject to write access protection, a second plurality of nonvolatile memory locations that hold first data; and
writing a first value stored in a password register and in succession to writing the first value, writing a second value that is not stored in the password register to cause the write access protection of the second plurality of nonvolatile memory locations to become not configurable.

17. The method of claim 16, wherein serial presence detect information in the first plurality of nonvolatile memory locations is stored according to a serial presence detect standard.

18. The method of claim 17, further comprising:
successively writing the first value that is stored by the password register two times to configure the write access protection of the second plurality of nonvolatile memory locations.

19. The method of claim 18, wherein the second plurality of nonvolatile memory locations is divided into a plurality of groups of memory locations, the method further comprising:
configuring the write access protection of a first group of the plurality of groups of memory locations independently of the other of the plurality of groups of memory locations.

20. The method of claim 19, wherein each group of the plurality of groups of memory locations comprises 256 memory locations and there are three groups of memory locations in the plurality of groups of memory locations.

* * * * *